June 2, 1964  D. O. DAVIES ETAL  3,135,562
BEARINGS
Filed Jan. 7, 1963  2 Sheets-Sheet 1
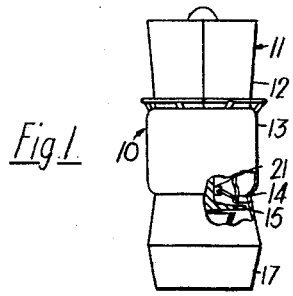
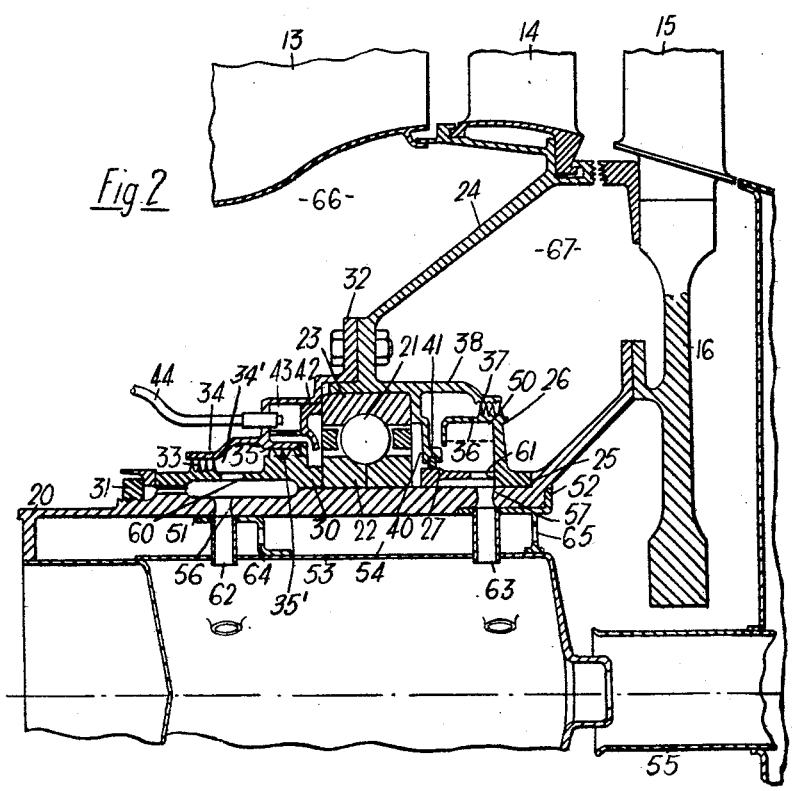
David Omri Davies
John Michael Storer Keen
George Kenneth Hensman
Inventors
By Fred E. Shoemaker
Fred L. Witherspoon, Attorney June 2, 1964  D. O. DAVIES ETAL  3,135,562
BEARINGS
Filed Jan. 7, 1963  2 Sheets-Sheet 2
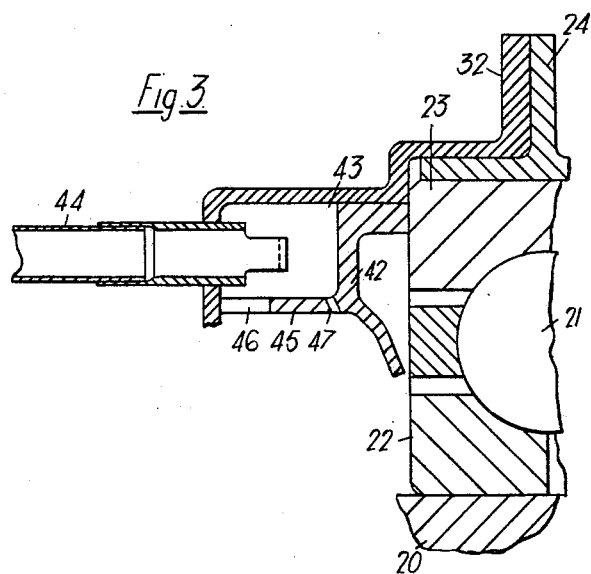
David Omri Davies
John Michael Stower Keen
George Kenneth Hensman
Inventor
By Fred E. Shoemaker
Fred L. Witherspoon Attorney United States Patent Office 3,135,562
Patented June 2, 1964

3,135,562
BEARINGS
David Omri Davies, Kingsway, John Michael Storer Keen, Allestree, and George Kenneth Hensman, Chellaston, England, assignors to Rolls-Royce Limited, Derby, England, a company of Great Britain
Filed Jan. 7, 1963, Ser. No. 249,836
4 Claims. (Cl. 308—36.1)

This invention relates to bearings. According to the invention there is provided a shaft bearing arrangement, particularly for vertical shafts, having two chambers sealed against the shaft and separated by a sealed lubricant chamber which houses the bearing, said chambers being connected so as to be at the same pressure, characterised in that each chamber is connected to a discharge outlet via an internal duct means in the shaft, so that when an external fluid pressure differential exists across the bearing, the fluid leaking into either of said chambers escapes via said internal duct means and said discharge outlet without entering the lubricant chamber.

Providing said duct within the shaft rather than externally of said bearing gives a more compact arrangement.

Preferably an annular passage is provided in the shaft surrounding said internal duct means, for conveying a flow of cooling medium for cooling the bearing. This gives a simpler and more compact arrangement than one in which a cooling medium flows externally around the lubricant chamber.

Preferably the shaft carries a fixed cup-shaped portion forming part of one of said two chambers and communicating with said internal duct means, which cup-shaped portion is disposed so as to receive and retain against the outer wall thereof oil which leaks from the lubricant chamber when the shaft rotates, the oil being forced radially outwardly by centrifugal force, whereby the risk of such oil blocking said internal duct means is reduced.

Preferably the lubricant chamber is provided with walls defining a lubricant reservoir which communicates with the bearing via a metering orifice in said walls, and a port is also formed in said walls which occupies an upper position relative to the reservoir when the shaft is appropriately vertically disposed, said port providing overflow communication for lubricant between the lubricant reservoir and the bearing.

The term "vertical lift engine" as used in this specification is intended to indicate an engine which is adapted to produce vertical lift forces on the said aircraft independently of those generated aerodynamically by forward flight thereof.

The invention is illustrated, merely by way of example in the drawings accompanying this specification, in which:

FIGURE 1 is a diagrammatic elevation, partly in section, of a vertical lift gas turbine engine for an aircraft, the said engine embodying the present invention, FIGURE 2 is a broken away section illustrating a part of the engine of FIGURE 1 on a larger scale (the section of FIGURE 2 being shown for convenience in a horizontal position), and FIGURE 3 is a broken away section illustrating a part of the structure shown in FIGURE 2 on a yet larger scale.

Referring to the drawings, a vertical lift gas turbine engine 10 for an aircraft (not shown) is of lightweight construction and comprises an engine casing 11 within which is mounted in flow series a multi-stage axial compressor 12 (which may have an aluminium compressor shaft, not shown), combustion equipment 13, a ring of angularly spaced apart nozzle guide vanes 14, and a single stage axial turbine 15 having a turbine disc 16 which may be formed of titanium. The turbine exhaust gases are directed to atmosphere through a jet pipe 17.

The turbine disc 16 is connected to the said compressor shaft (not shown) by a stub shaft 20 whose downstream end is rotatably mounted within a thrust bearing 21. The bearing 21 has a split inner race 22 and an outer race 23.

The outer race 23 is carried by an annular, stationary wall member 24. The stationary wall member 24 carries the said ring of nozzle guide vanes 14 and is connected thereby to the engine casing 11 and hence to fixed structure.

The stub shaft 20 is provided with a shoulder 25 against which is located a cup-shaped portion in the form of a bearing housing member 26. The member 26 is spaced from the split inner race 22 by a bearing housing member 27. A bearing housing member 30, which is splined onto the stub shaft 20, engages the split inner race 22 and is held in position by a nut 31 which is threaded onto the stub shaft 20. The bearing housing members 26, 27, 30 thus rotate with the stub shaft 20.

A bearing housing member 32 is bolted to the stationary wall member 24. The bearing housing member 30 is provided with a labyrinth seal 33 by means of which the member 30 is sealed to an axially extending portion 34 of the member 32. The member 32 also has a portion 35 which is sealed to the member 30 by a labyrinth seal 35' so that a first sealed chamber 34' is provided which is sealed by the seals 33, 35'.

The bearing housing member 26 has a rim in the form of an outer wall 36 provided with a labyrinth seal 37 by means of which it is sealed to an axially extending portion 38 of the stationary wall member 24. The stationary wall member 24 also has a radially extending portion 40 which is sealed to the bearing housing member 27 by a seal 41.

It will be seen that the bearing 21 is disposed in a sealed lubricant chamber which is sealed by seals 35' and 41.

Mounted within said sealed lubricant chamber and within the bearing housing member 32 is an annular member 42 which defines with the member 32 a lubricant reservoir 43 which may, for instance, be of 15 cc. capacity. A feed pipe 44 is provided to feed single shots of lubricant into the reservoir 43.

The annular member 42 has an axially extending wall 45 (FIG. 3) which is provided with overflow ports 46 and with drillings 47. The arrangement is such that, when the reservoir 43 is supplied with a single shot of lubricant, some of the lubricant will initially overflow through the ports 46 and pass through the sealed chamber inwardly thereof to the bearing 21. Thereafter, the bearing 21 will be supplied with a metered quantity of lubricant from the drillings 47, this metered quantity being sufficient to lubricate the bearing 21 throughout a take-off or landing.

The lubricant which has been supplied to the bearing 21 may drain therefrom and may pass the seal 41 so as to enter a second sealed chamber 50 in the form of a collector chamber whose walls are constituted by the bearing housing members 26, 27. The collector chamber 50 may have a capacity of, say, 20 cc. As will be seen from FIGURE 2 the rim or outer wall 36 is spaced radially outwardly of the shaft and extends adjacent the seal 41 so that the bearing housing member 26 receives and retains against the outer wall 36 oil which leaks past the seal 41 when the shaft rotates.

Mounted within the stub shaft 20 and secured thereto by brackets 51, 52 is an internal duct means in the form of a cylindrical vent chamber 53. The vent chamber 53 is spaced from the stub shaft 20 by an annular space 54 whose upstream end is supplied (by means not shown) with cooling air from the compressor 12. The vent chamber 53 is vented to atmosphere by way of a pipe 55.

The stub shaft 20 is provided with apertures 56, 57 which respectively communicate with apertures 60, 61 in the bearing housing members 30, 27 respectively. The apertures 60, 61 respectively communicate with those sides of the labyrinth seals 33, 37 adjacent the bearing 21. The apertures 56, 57 respectively communicate with stub pipes 62, 63 which extend into the vent chamber 53.

The brackets 51, 52 have apertures 64, 65 therein respectively to permit the cooling air supplied to the annular space 54 to flow therethrough and thus to pass along the downstream side of the turbine disc 16 so as to cool the latter.

The pressure in the space 66, which lies upstream of the stationary wall member 24, will, when the engine is in operation, be higher than that in the space 67 which lies downstream of the stationary wall member 24. There could therefore be a danger that hot gases would leak through the labyrinth seal 33, through the seal (not shown) between the bearing housing member 30 and the portion 35 of the bearing housing member 32, through the bearing 21, past the seal 41, and through the labyrinth seal 37.

This danger of hot gases passing through the bearing 21 is, however, avoided by the construction shown in FIGURE 2, since, if hot gases should leak through the labyrinth seal 33, they will immediately pass to atmosphere through the apertures 60, 56, stub pipes 62, vent chamber 53 and pipe 55. Similarly, if hot gases should leak through the labyrinth seal 37, they will immediately pass to atmosphere through the apertures 61, 57, stub pipes 63, vent chamber 53 and pipe 55.

When the engine 10 is in operation, lubricant which has drained into the collector chamber 50 will be held centrifugally against the outer wall 36. When, however, the shaft 20 ceases to rotate, lubricant in the collector chamber 50 may pass through the apertures 61, 57 and stub pipes 63 to the vent chamber 53 and so to atmosphere.

We claim:

1. A shaft bearing assembly comprising a shaft, a bearing in which the shaft is mounted, a wall supporting the bearing, two pairs of spaced seals, one pair on each axial side of the bearing and sealing the wall against the shaft, the wall, the shaft and said seals providing a sealed lubricant chamber within which said bearing is disposed, and two sealed chambers one on each axial side of the lubricant chamber, internal duct means being provided in said shaft and communicating with each of said two chambers and with exhaust, whereby when an external fluid pressure differential exists across the bearing, the fluid leaking into either of said chambers escapes via said internal duct means to exhaust without entering the lubricant chamber.

2. A shaft bearing assembly comprising a shaft, a bearing in which the shaft is mounted, a wall supporting the bearing, two pairs of spaced seals, one pair on each axial side of the bearing and sealing the wall against the shaft, the wall, the shaft and said seals providing a sealed lubricant chamber within which said bearing is disposed, and two sealed chambers one on each axial side of the lubricant chamber, said shaft being provided internally thereof with an annular passage for conveying a flow of cooling medium for cooling the bearing, an internal duct means surrounded by said annular passage and communicating with exhaust, and conduit means extending across said annular passage and connecting said internal duct means with each of said two chambers, whereby when an external fluid pressure differential exists across the bearing, the fluid leaking into either of said chambers escapes via said internal duct means to exhaust without entering the lubricant chamber.

3. A shaft bearing assembly comprising a shaft, a bearing in which the shaft is mounted, a wall supporting the bearing, two pairs of spaced seals, one pair on each axial side of the bearing and sealing the wall against the shaft, the wall, the shaft and said seals providing a sealed lubricant chamber within which said bearing is disposed, and two sealed chambers one on each axial side of the lubricant chamber, internal duct means being provided in said shaft and communicating with each of said two chambers and with exhaust, whereby when an external fluid pressure differential exists across the bearing, the fluid leaking into either of said chambers escapes via said internal duct means to exhaust without entering the lubricant chamber, a cup-shaped portion fixed co-axially on the shaft and forming part of one of said two chambers, said cup-shaped portion communicating with said internal duct means, a rim provided on said cup-shaped portion and spaced radially outwardly of the shaft, said rim extending adjacent one of said seals sealing the lubricant chamber, so that the cup-shaped portion receives and retains against said rim thereof oil which leaks from the lubricant chamber when the shaft rotates, the oil being forced radially outwardly by centrifugal force, whereby the risk of such oil blocking said internal duct means is reduced.

4. A shaft bearing assembly comprising a shaft, a bearing in which the shaft is mounted, a wall supporting the bearing, two pairs of spaced seals, one pair on each axial side of the bearing and sealing the wall against the shaft, the wall, the shaft and said seals providing a sealed lubricant chamber within which said bearing is disposed, and two sealed chambers one on each axial side of the lubricant chamber, wall sections carried by said wall and disposed in said lubricant chamber, said wall sections defining a lubricant reservoir, a metering orifice in said wall sections and providing communication for lubricant between said lubricant reservoir, and said bearing, a port also in said wall sections which occupies an upper position relative to the reservoir when the shaft is appropriately vertically disposed, said port providing overflow communication for lubricant between the lubricant reservoir and the bearing, means for supplying shots of lubricant to said lubricant reservoir, each shot being sufficient to cause the lubricant to overflow through said port and immediately lubricate said bearing, internal duct means being provided in said shaft and communicating with each of said two chambers and with exhaust, whereby when an external fluid pressure differential exists across the bearing, the fluid leaking into either of said chambers escapes via said internal duct means to exhaust without entering the lubricant chamber.

References Cited in the file of this patent

UNITED STATES PATENTS 3,057,542     Keenan et al.            Oct. 9, 1962

FOREIGN PATENTS 1,110,622     France                 Oct. 12, 1955